United States Patent [19]
Yuki

[11] Patent Number: 5,138,654
[45] Date of Patent: Aug. 11, 1992

[54] FACSIMILE APPARATUS

[75] Inventor: Akira Yuki, Fukuoka, Japan

[73] Assignee: Matsushita Electric Industrial Co., Ltd., Kadoma, Japan

[21] Appl. No.: 497,022

[22] Filed: Mar. 21, 1990

[30] Foreign Application Priority Data

Apr. 5, 1989 [JP] Japan .................... 1-86212

[51] Int. Cl.⁵ ............................ H04M 11/00
[52] U.S. Cl. .................................... 379/100
[58] Field of Search ............ 379/100, 142, 96, 97, 379/98, 93

[56] References Cited

U.S. PATENT DOCUMENTS

| 4,304,968 | 12/1981 | Klausner et al. | 379/142 |
| 4,654,718 | 3/1987 | Sueyoshi | 379/100 |
| 4,847,891 | 7/1989 | Kotani | 379/100 |

FOREIGN PATENT DOCUMENTS

| 0000855 | 1/1989 | Japan | 379/100 |
| 0117559 | 5/1989 | Japan | 379/100 |
| 0309454 | 12/1989 | Japan | 379/100 |
| 0320850 | 12/1989 | Japan | 379/100 |

Primary Examiner—James L. Dwyer
Assistant Examiner—Stella L. Woo
Attorney, Agent, or Firm—Cushman, Darby & Cushman

[57] ABSTRACT

After completion of reception of a facsimile letter in a facsimile apparatus, a telephone of which the telephone number is registered in advance at the facsimile apparatus and which is installed apart from the facsimile apparatus is automatically called. Then a predetermined voice message is sent to the called party of the telephone in order to inform reception of the facsimile letter and the number of the facsimile communications received.

4 Claims, 2 Drawing Sheets

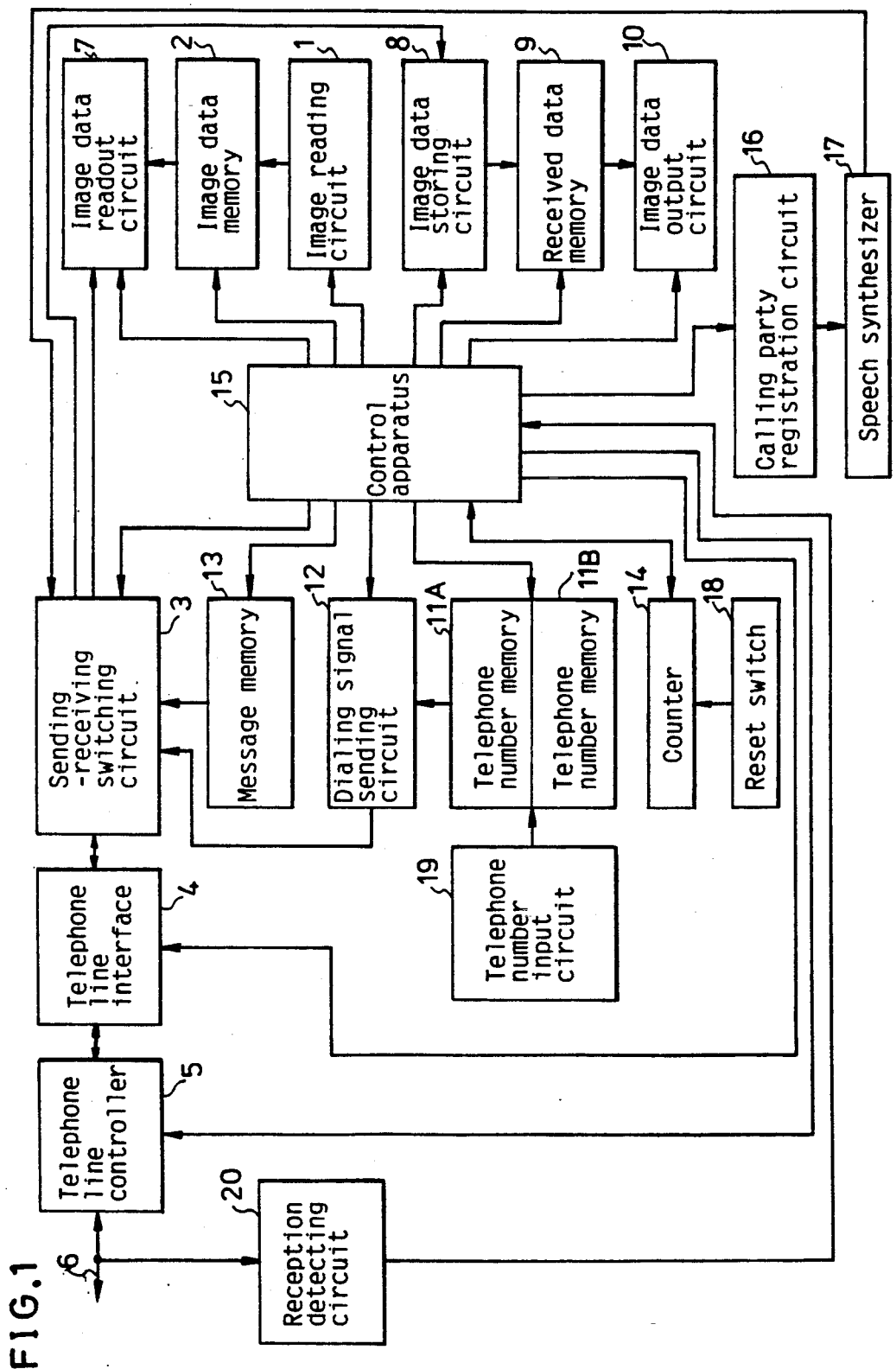

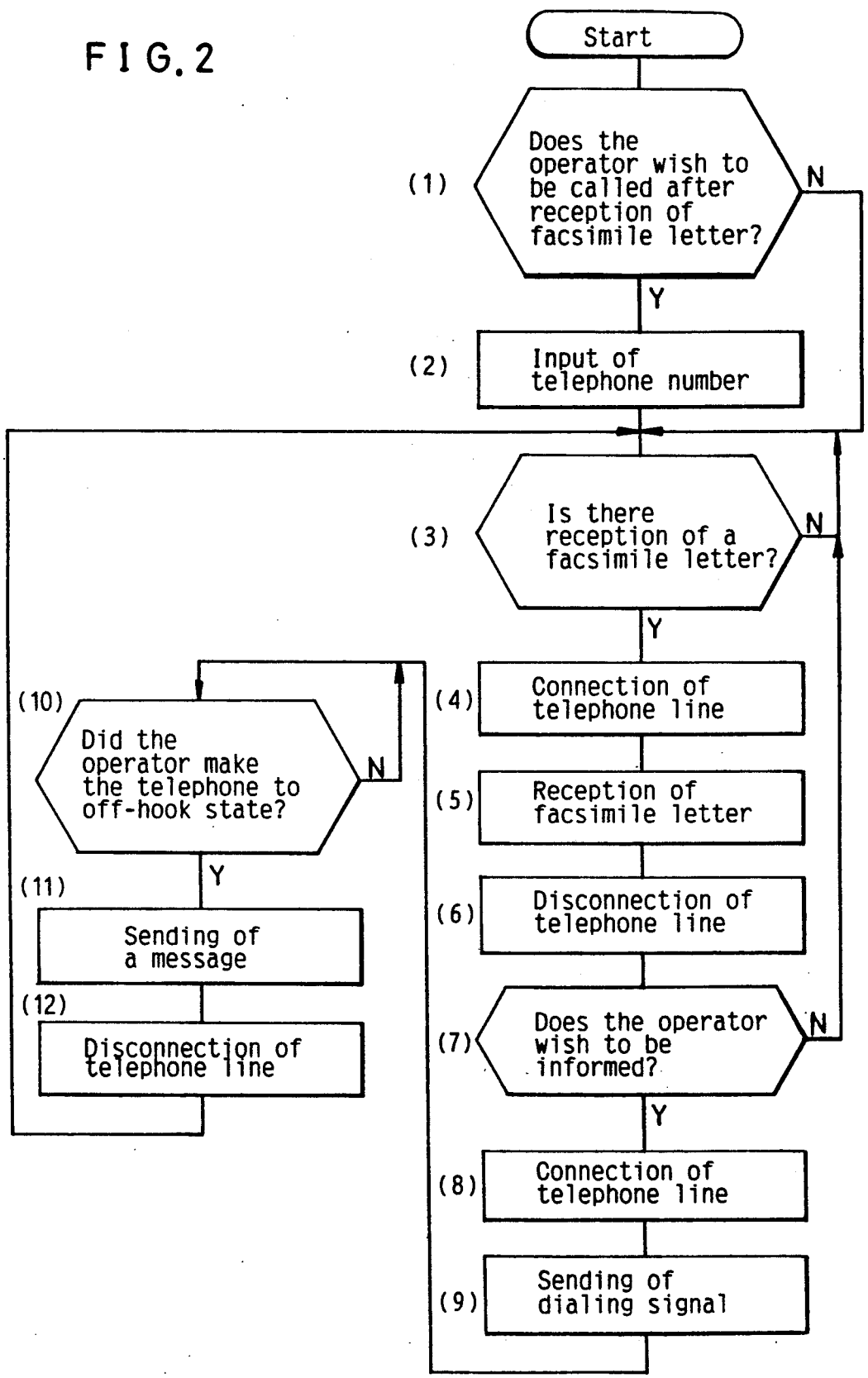

FACSIMILE APPARATUS

FIELD OF THE INVENTION AND RELATED ART STATEMENT

1. Field of the Invention

The present invention relates generally to a facsimile apparatus.

2. Description of the Related Art

In general, a facsimile apparatus is installed at a predetermined place in an office, thus an operator of the facsimile apparatus must come to the facsimile apparatus at regular intervals or at irregular intervals in order to ascertain arrival of a facsimile letter. If he neglects such ascertainment, he cannot be noticed of an important facsimile letter, or scores of the facsimile letters which have arrived before he is aware of it, and further he must make complicated and troublesome work to assort these facsimile letters.

OBJECT AND SUMMARY OF THE INVENTION

An object of the present invention is to provide a facsimile apparatus having means for informing of reception of a facsimile letter to a predetermined called party waiting for the reception at a place which is apart from the location of the facsimile apparatus.

A facsimile apparatus in accordance with the present invention comprises:

image receiving mean for receiving an image signal of a facsimile communication sent from a calling party via a telephone line.

image reproducing means for reproducing a visible image from the image signal, a reception detector for detecting reception of the image signal of the facsimile communication, telephone number storage means for storing the telephone number of a telephone of an operator of the facsimile apparatus which is located apart from the facsimile apparatus, dialing signal sending means for sending the dialing signal of the telephone number after completion of a reception of a facsimile communication, memory means for memorizing a message to be forwarded to the operator for informing of a reception of facsimile communication, and message sending means for sending the message to the telephone when it becomes an off-hook state.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a block diagram of a facsimile apparatus of an embodiment in accordance with the present invention;

FIG. 2 is a flow chart of receiving operation in the embodiment.

DESCRIPTION OF THE PREFERRED EMBODIMENTS

FIG. 1 is a block diagram of a main part of a facsimile apparatus of an embodiment in accordance with the present invention. Referring to FIG. 1, in sending operation of the facsimile apparatus, letters and/or picture of a manuscript to be sent is read by an image reading circuit 1 composed of an automatic manuscript feeder and a line-type image sensor. An image signal read by the image reading circuit 1 is memorized in an image data memory 2 composed of a magnetic disc or RAM, for example. A send/receive switching circuit 3 for switching operations of sending or receiving of the image signal is coupled to a telephone line 6 via a telephone line interface 4 and a telephone line controller 5 for performing connection or disconnection of the telephone line. An image data readout circuit 7 reads out picture data memorized in the image data memory 2 and send to the send/receive switching circuit 3.

In receiving operation of the facsimile apparatus, an image data storing circuit 8 controls a received signal, which is inputted through the telephone line controller, telephone line interface 4 and send/receive switching circuit 3, and applies the received signal to a reception data memory 9. An image data output circuit 10 comprises data readout circuit for reading out the image data from the reception data memory 9, a platen (not shown) and a thermal head, which is disposed to face to the platen, and reproduces a visible image on a paper on the basis of the picture data. Telephone number memories 11A and 11B memorize predetermined telephone numbers. The telephone number memory 11A memorizes telephone numbers of called parties to which a facsimile communication has been addressed many times; the telephone number memory 11B memorizes a telephone number of a telephone for a facsimile operator, who is apart from the facsimile apparatus, in order to call the operator when a facsimile communication is received. These telephone numbers are inputted into the telephone number memories 11A and 11B with a telephone number input circuit 19 such as a keyboard.

A dialing signal sending circuit 12 generates a dialing signal corresponding to a telephone number which is memorized in the telephone number memories 11A and 11B, and send it to the telephone line 6. A message to be sent to the operator has been memorized preliminarily in advance in a message memory 13.

Data concerning several calling parties (for example, name and/or telephone number) which frequently send a facsimile communication to the facsimile apparatus are stored in advance in a calling party registration circuit 16. When the registered calling party called, the data of a calling party accompanied with the facsimile communication is received by the calling party registration circuit 16, and when the received data coincide with one of the registered data, the signal based on the data of the calling party is applied to a speech synthesizer 17. Hence, a voice message for informing of the name of the calling party is sent to the operator. The voice message is announced, for example, "the calling party is the ABC company". A counter 14 counts the number of reception of the facsimile letter. A control circuit 15 controls the respective circuits and parts of the facsimile apparatus, and is composed of a microcomputer, for instance. By means of the control circuit 15, after finish of reception of a facsimile letter, the telephone line controller 5 maintains closing status of the telephone line 6, and the dialing signal sending circuit 12 generates the dialing signal corresponding to the number of telephone of the operator memorized in the telephone number memory 11B. Additionally, the message memorized in the message memory 13 is sent out to the telephone line 6.

The circuits of image reading circuit 1, image data memory 2, image data readout circuit 7 and telephone number memories 11A and 11B are known circuits for use in facsimile transmission to another facsimile apparatus connected by the telephone lines.

Operation of the above-mentioned embodiment is described hereafter.

First, reception process of a facsimile communication is elucidated with reference to the flow chart as shown in FIG. 2. In the event that the operator wishes to be informed of a reception of a facsimile communication in the facsimile apparatus by means of a telephone (Step 1), he registers number of his telephone which is available for him, into the telephone number memory 11B (Step 2).

When a facsimile letter is received in the facsimile apparatus, a reception detecting circuit 20 detects it and issues a signal to the control circuit 15 (Step 3). Subsequently, the telephone line controller 5 connects the telephone line interface 4 to the telephone line 6 under control of the control circuit 15 (Step 4). An image signal from the telephone line 6 is applied to the send-/receive switching circuit 3 via the telephone line interface 4. The image signal is memorized in the reception data memory 9 via the image data storing circuit 8 (Step 5).

Then, the image data output circuit 10 reads out the image data from the reception data memory 9 and prints a visible image on a paper (not shown) under control of the control circuit 15.

A counter 14 counts the number of reception of the facsimile letter.

After completion of reception of the image signal, the telephone line 6 is disconnected for a brief period of time by the operation of the telephone line controller 5, and then is connected again (Step 8). Subsequently, the dialing signal based on the telephone number of the operator registered in the telephone number memory 11B is sent out from the dialing signal sending circuit 12 to the telephone line 6 (Step 9). Then the telephone of the operator is called.

When the telephone of the operator is made to an off-hook state (Step 10), the message memorized in the message memory 13 is sent to the telephone of the operator (Step 11). The message is an announcement such as "one facsimile communication to you is received", and the message is followed by the name of the calling party. Therefore as a summary for instance, "one facsimile communication to you is received from ABC company". After then, the telephone line 6 is disconnected (Step 12), and the facsimile apparatus returns to stand by.

When a successive facsimile communication is received, in a manner similar to that described hereinabove, the data in the counter 14 is advanced to the numeral value "2", and the operator is called to be informed of the reception of facsimile communication by such an announcement of "two facsimile communications are received now". Such telephone call to the operator is performed at every reception of a facsimile letter.

The operator which was informed of the reception of the facsimile communication comes to the facsimile apparatus and takes out the facsimile communication printed out from the image data output circuit 10, and then resets the counter 14 with a reset switch 18, or by an automatic reset switch 18 interlinked to a known printed communication holder.

According to the present invention, even in case that the operator does not always stay adjacent to the facsimile apparatus, the telephone of the operator is called and a predetermined message for informing of reception of a facsimile letter is sent thereto, at every reception of a facsimile communication in the facsimile apparatus, since the number of the telephone adjacent to the operator is registered in the facsimile apparatus. Hence, the operator is immediately and automatically noticed of the reception of the facsimile communication, even at a place apart from the facsimile apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A facsimile apparatus comprising:
   image receiving means for receiving an image signal of a facsimile communication sent from a calling party via a telephone line,
   image reproducing means for reproducing a visible image from said image signal,
   a reception detector for detecting reception of said image signal of said facsimile communication,
   a counter for counting a number of occurrences of reception of said facsimile communication,
   telephone number storage means for storing a telephone number of a telephone of an operator of the facsimile apparatus which is located apart from said facsimile apparatus,
   dialing signal sending means for sending a dialing signal indicative of said telephone number to a telephone line after completion of a reception of a facsimile communication,
   memory means for memorizing a message to be forwarded to said operator for informing of a reception of facsimile communication, and
   message sending means for sending said message and a number of occurrences of reception from said counter to said telephone line when it becomes an off-hook state.

2. A facsimile apparatus comprising:
   image receiving means for receiving an image signal of a facsimile communication sent from a calling party via a telephone line,
   image reproducing means for reproducing a visible image from said image signal,
   a reception detector for detecting reception of said image signal of said facsimile communication,
   a counter for counting a number of occurrences of reception of said facsimile communication,
   telephone number storage means for storing a telephone number of a telephone placed apart from said facsimile apparatus,
   message memory means for memorizing a voice message which indicates reception of a facsimile communication,
   dialing signal sending means for sending a dialing signal corresponding to said telephone number of said telephone to a telephone line after completion of reception of a facsimile communication, and
   message sending means for sending said voice message and a number of occurrence of reception from said counter to the telephone line only after detecting an off-hook state of said telephone line.

3. A facsimile apparatus comprising:
image receiving means for receiving an image signal of a facsimile communication sent from a calling party via a telephone line,
image reproducing means for reproducing a visible image from said image signal,
a reception detector for detecting reception of said image signal of said facsimile communication,
a counter for counting a number of occurrences of reception of said facsimile communication,
telephone number storage means for storing a telephone number of a telephone placed apart from said facsimile apparatus,
message memory means for memorizing a message which indicates said number of receptions of said facsimile communication,
dialing signal sending means for sending a dialing signal corresponding to said telephone number of said telephone to a telephone line after completion of reception of a facsimile communication, and
message sending means for sending said message to the telephone line only after detecting an off-hook state of said telephone line.

4. A facsimile apparatus in accordance with any of claims 1, 2 or 3 further comprising:
calling party data storage means for storing data for identifying said calling party, and
a speech synthesizer for generating a voice message based on said data for identifying said calling party, said voice message being sent by said message sending means.

* * * * *